United States Patent [19]

Letournoux et al.

[11] 4,190,226
[45] Feb. 26, 1980

[54] VEHICLE SEAT SLIDES

[75] Inventors: Alain Letournoux, St. Jean de Blanc; René Droual, Ris Orangis, both of France

[73] Assignee: Societe Industrielle Bertrand Faure, Etampes, France

[21] Appl. No.: 948,303

[22] Filed: Oct. 3, 1978

[30] Foreign Application Priority Data

Oct. 19, 1977 [FR] France ............................... 77 31474

[51] Int. Cl.² ............................................ F16M 13/00
[52] U.S. Cl. .................................. 248/429; 248/393
[58] Field of Search .............. 248/393, 394, 395, 429, 248/430; 74/527; 297/346

[56] References Cited

U.S. PATENT DOCUMENTS

| | | | |
|---|---|---|---|
| 2,130,159 | 9/1938 | Saunders et al. | 74/527 X |
| 2,791,124 | 5/1957 | Gossard | 74/527 X |
| 2,958,233 | 11/1960 | Johnson | 74/527 X |
| 3,165,351 | 1/1965 | Clancy et al. | 248/429 X |
| 3,204,916 | 9/1965 | Pickles | 248/429 |
| 3,286,971 | 11/1966 | Walter et al. | 248/429 |
| 3,355,211 | 11/1967 | Kolle | 248/429 X |
| 3,362,748 | 1/1968 | Carter | 248/429 X |
| 3,479,099 | 11/1969 | Krause | 248/429 X |
| 3,930,632 | 1/1976 | Shigeta | 248/429 |
| 4,088,378 | 5/1978 | Pallant | 248/429 X |

FOREIGN PATENT DOCUMENTS

| | | | |
|---|---|---|---|
| 2304951 | 8/1973 | Fed. Rep. of Germany | 248/429 |
| 2426900 | 12/1974 | Fed. Rep. of Germany | 248/429 |
| 2559653 | 6/1977 | Fed. Rep. of Germany | 248/393 |
| 1240312 | 7/1960 | France | 248/429 |
| 1008128 | 10/1965 | United Kingdom | 248/429 |

*Primary Examiner*—J. Franklin Foss
*Attorney, Agent, or Firm*—Larson, Taylor and Hinds

[57] ABSTRACT

A slide for adjusting the longitudinal position of a vehicle seat, comprising an upper shaped-section adapted to slide along a fixed lower shaped-section and carrying a bolt adapted to coact with a fixed rack. The bolt is controlled by a longitudinal rod housed in two transverse lugs, the front one being integral with the upper shaped section and forming a transverse pivoting axis X whereas the rear one is integral with the bolt, which is mounted so as to pivot about a longitudinal axis Y. A torsion spring ensures that the resilient return and the positioning of the parts.

6 Claims, 3 Drawing Figures

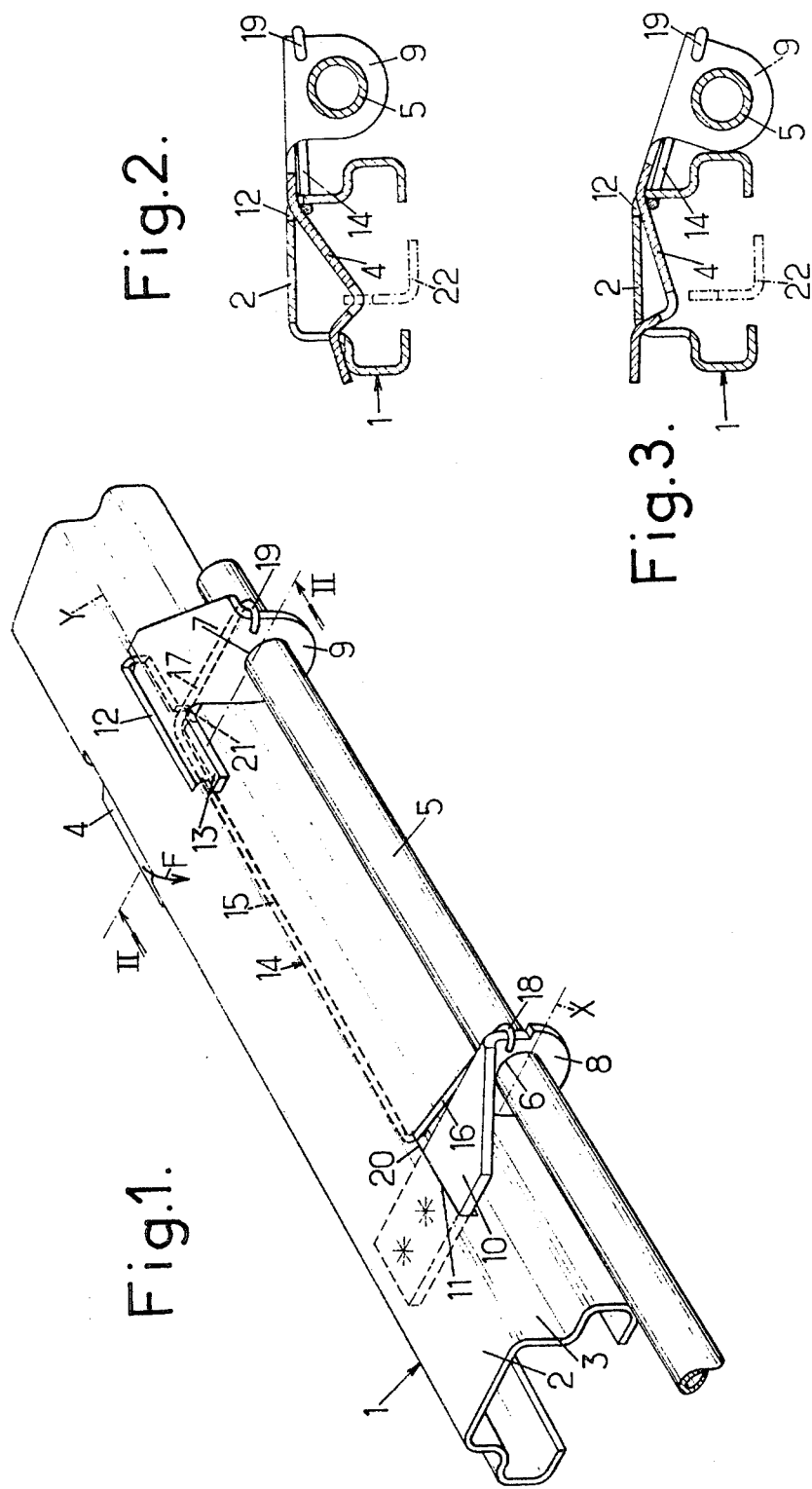

VEHICLE SEAT SLIDES

The invention relates to slides for adjusting the position of a vehicle seat in the longitudinal direction, i.e. forwards or backwards, these slides being two in number, extending in a parallel direction under said seat and each comprising a lower shaped-section fixed to the floor of the vehicle and an upper shaped-section connected to the seat and adapted to slide along the lower shaped-section, generally with interposition of balls.

It relates more particularly, among these slides, to those in which the longitudinal locking of the upper shaped-section is provided by cooperation of a bolt mounted on this shaped-section with the teeth or notches of a longitudinal rack integral with the lower shaped-section, the control of the movements of the bolt against the return force of a spring being provided by means of a rigid rod which extends along the slide and which is itself pivotably mounted on a tranverse axis connected to the upper shaped-section.

Generally, the rod in question forms, with a second parallel rod corresponding to the second slide of the seat considered and with a length of rod extending transversely under the front of the seat and interconnecting these two rods, a control hoop or bar easily accessible to the person sitting in the seat.

In known embodiments of such slides, each bolt is associated with a longitudinal lever pivotably mounted on a transverse axis pin welded to the upper shaped section of the slide and the rod is fixed to the arm, of this lever, opposite the bolt.

An aim of the invention is to provide for the locking mechanism of the slide a particularly robust and simple construction in which the above lever has been done away with, and which can be housed and operated in a very small vertical space not exceeding that of the slide.

It is essentially characterized in that, the bolt being mounted in a way known per se so as to pivot about a longitudinal axis connected to the upper shaped section, the control rod is housed in two holes provided respectively in two transverse vertical lugs, the front one of which is integral with said upper shaped-section whereas the rear one is integral with said bolt.

In preferred embodiments, recourse is had furthermore to one and/or the other of the following arrangements:

the longitudinal distance between the two lugs is of the order of 10 cms or more, the rear lug extends vertically downwards from a substantially horizontal plate which forms the bolt and is pivotably mounted on the rectilinear horizontal lower edge of an aperture provided in the upper part of a lateral flange of the upper shaped section, the front lug extends vertically downwards from a horizontal plate welded to the lower face of the back of the upper shaped-section and passing through a horizontally elongated aperture provided in the upper part of a lateral flange of the upper shaped-section, the apertures mentioned in the two preceding paragraphs each have a local enlarged portion adapted to let the same metal wire forming a torsion spring pass therethrough, substantially at the level of two bends in this wire connecting respectively a longitudinal median rectilinear strand of said wire, inside the upper shaped section, with two rectilinear strands each extending in a substantially horizontal transverse direction along a lug and finishing in a hook which straddles said lug, in a slide according to the preceding paragraph, each transverse strand of wire extends above the rod, the front strand tending to be applied against the rod and engaging preferably in a groove provided in this rod whereas the rear strand tends on the contrary to move away from the rod and bears under a horizontal projection forming part of the portion of the bolt extended by the rear lug.

The invention comprises, apart from these main arrangements, certain other arrangements which are used preferably at the same time and which will be more explicitly discussed hereafter.

In what follows, a preferred embodiment of the invention will be described with a reference to the accompanying drawing, of course in a non-limiting way.

FIG. 1, of this drawing, shows in perspective a portion of a vehicle seat slide constructed in accordance with the invention.

FIG. 2 is a vertical section along II—II of FIG. 1 of this slide in its locking position.

FIG. 3 is a section similar to that of FIG. 2, but in which the slide is unlocked.

In a way known per se, the vehicle seat considered comprises two parallel slides and each of these slides comprises:

a lower shaped-section not shown, integral with the floor of the vehicle and carrying a longitudinal rack or similar (shown schematically at 22 in FIGS. 2 and 3), an upper shaped-section 1 whose transverse section has the general shape of an inverted U, formed from a horizontal flat upper back 2 and two substantially vertical side flanges 3, this upper shaped-section being mounted so as to be able to slide along the lower shaped-section with interposition of sliding or bearing members such as balls, a bolt 4 adapted to coact with the rack and mounted on the upper shaped-section so as to be connected thereto in a longitudinal direction but able to move in relation thereto in a transverse plane, a spring for constantly urging the bolt towards a locking position in which it is engaged with the rack, and a control member easily accessible to the person sitting in the seat for moving the bolt against the return force of a spring.

The control member is here a rigid longitudinal rod 5, which forms preferably one of the two legs of a hoop or bar whose other leg controls the bolt of the other slide fitted to the seat considered, the median horizontal strand of this hoop extending transversely under the front portion of the seat and serving as a control handle.

This rod 5 is mounted in two holes 6 and 7 provided respectively in two transverse lugs 8 and 9, the front lug 8 being integral with shaped-section 1 whereas the rear lug 9 is integral with bolt 4.

It is in short the front lug, or more exactly the edge of hole 6 provided in this lug, which gives material form to the transverse horizontal pivoting axis X of rod 5.

The longitudinal distance D between the two lugs 8 and 9 is relatively large, being for example of the order of 10 cms or more.

In addition, bolt 4 is mounted so as to pivot about a longitudinal axis given material form by a rectilinear contact zone Y between this bolt and a portion of shaped-section 1, this zone being situated close to the rear end of rod 5: the transverse distance d between the axis of this rod 5 and axis Y is relatively small, being for example of the order of 2 cms.

These different arrangements cumulate their effects to give a relatively low value to the ratio between the vertical travel of control of the front end of rod 5 and the corresponding amplitude of deflection of the active portion of the bolt.

This vertical travel of control may then be very small and compatible with a space of reduced height (for example of the order of 2 cms only) available between the floor of the vehicle and the underneath of the sitting portion of the seat.

Lug 8 is preferably formed by the vertical lateral extension of a horizontal plate 10 welded against the lower face of the back 2 of shaped-section 1, this plate passing through an oblong aperture 11 provided in a flange 3 of said shaped section.

Lug 9 is preferably formed by a vertical turned down portion forming part of a bent horizontal plate forming bolt 4.

Pivoting zone Y of this bolt is given material form by the lower horizontal rectilinear edge of an oblong aperture 12 provided in the same flange 3 as aperture 11.

Bolt 4 passes through this aperture 12 so as to have its active portion inside shaped section 1 and its lug 9 outside.

The position of this bolt in said aperture 12 is defined by the abutment of shoulders 13 of said bolt against the outside end edges of this aperture, the permanent application of these shoulders against this edge being ensured in a way which will be described further on.

According to another particularly advantageous arrangement of the invention, a torsion spring 14 is provided having the general shape of a U formed, on the one hand, by a median rectilinear strand 15 relatively long and, on the other hand, from two shorter rectilinear strands 16 and 17 connected at right angles to strand 15 and each finishing in a hook (18, 19).

At the level of its connecting bends this spring passes through local enlarged portions 20 and 21 of apertures 11 and 12 so that the median strand 15 extends longitudinally inside shaped-section 1 and so that the two strands 16 and 17 extend in substantially horizontal transverse directions along lugs 8 and 9, above rod 5, the two hooks 18 and 19 jointingly straddling the corresponding lugs.

The torsion of the wire is provided so that the front strand 16 tends to be applied downwards against rod 5, engaging preferably in a transverse groove formed in this rod whereas, on the contrary, the rear strand 17 tends to rise up and bear under a horizontal projection which connects lug 9 to the rest of bolt 4.

This spring 14 fulfils a multiple role:

it permanently urges bolt 4, about axis Y, angularly towards its locking position in the direction of arrow F, it permanently maintains this bolt 4 in its partially engaged position in shaped-section 1 by applying the shoulders 13 of this bolt against the edges of aperture 12, when the mechanism is at rest, it cancels out any play between rod 5 and the edges of holes 6 and 7 through which this rod passes, by constantly urging this latter towards the bases of said holes, it ensures, by means of a snap catch, longitudinal locking of control rod 5 in its set position.

This multiplicity of functions assumed by spring 14 alone, which has a particularly simple pattern and so lends itself to easy construction, forms an important advantage of the invention.

The operation of the locking mechanism described above is the following.

At rest (FIGS. 1 and 2) spring 14 urges lug 9 towards its uppermost position and so the front end of control rod 5 towards its lowermost position, as also the active portion of the bolt, which then cooperates with rack 22: the slide is locked.

Raising of the front end of rod 5 causes this latter to pivot about the horizontal axis X against the return force of spring 14, which lowers lug 9 and causes the bolt to pivot about axis Y, thus raising its active portion.

A very small lift is sufficient, e.g. of the order of a centimeter, to completely free bolt 4 from rack 22 (FIG. 3).

The longitudinal position of the seat can then be adjusted by sliding the upper shaped-section of the slide and, after adjustment of said longitudinal position, simple release of rod 5 causes further locking after, if required, adjustment of position to bring the cooperating portions of the bolt and the rack in perfect register with each other.

The action of spring 14, which provides this locking, is assisted by the excess weight of the portion, of the control rod, which is located in front of axis X, in relation to its portion located behind this axis, especially when a control hoop is provided, which is the preferred case.

Following which, and whatever the embodiment adopted, there is provided a seat slide whose construction and operation follow sufficiently from what has gone before.

This slide presents a certain number of advantages with respect to those known heretofore: in particular, its locking mechanism may be entirely housed in the vertical space of the slide, including the control member for this mechanism, even during its operation, and the constituent parts of said locking mechanism are small in number, robust, inexpensive and easy to manufacture and assemble.

As is evident, and as it follows moreover already from what has gone before, the invention is in no wise limited to those of its modes of application and embodiments which have been more especially considered; it embraces, on the contrary, all variations thereof.

We claim:

1. A vehicle seat slide comprising a lower shaped-section intended to be fixed to the floor of the vehicle, an upper shaped-section intended to be fixed to the seat and adapted to slide along the lower shaped-section, a bolt mounted on the upper shaped-section and adapted to coact with a rack integral with the lower shaped-section, and a rigid rod for controlling the movements of the bolt against the return force of a spring, said rod extending along the slide and being itself pivotably mounted on a transverse axis connected to the upper shaped section, characterized in that, the bolt being mounted in a way known per se so as to pivot about a longitudinal axis connected to the upper shaped-section, the control rod is housed in two holes provided respectively in two transverse vertical lugs, the front one of which is integral with the upper shaped-section and the rear one of which is integral with the bolt.

2. A slide according to claim 1, characterized in that the longitudinal distance between the two lugs is of the order of 10 cms or more.

3. A slide according to any one of claims 1 and 2, characterized in that the rear lug extends vertically downwards from a substantially horizontal plate which forms the bolt and is pivotably mounted on the rectilinear horizontal lower edge of an aperture provided in the upper part of a lateral flange of the upper shaped-section.

4. A slide according to any one of claims 1 to 3, characterized in that the front lug extends vertically downwards from a horizontal plate welded against the lower face of the back of the upper shaped-section and passing through a horizontally elongated aperture provided in the upper part of a lateral flange of the upper shaped-section.

5. A slide according to any one of claims 3 and 4, characterized in that the apertures each have a local enlarged portion adapted for the passage therethrough of the same metal wire forming a torsion spring, substantially at the level of two bends of this wire connecting respectively a longitudinal median rectilinear strand of said wire, inside the upper shaped section, to two rectilinear strands each extending in a substantially horizontal transverse direction along a lug and finishing in a hook which straddles said lug.

6. A slide according to claim 5, characterized in that the transverse strands of wire extend above the rod, the front strand tending to be applied against the rod and engaging preferably in a groove provided in this rod and the rear strand tending on the contrary to move away from the rod and bearing under a horizontal projection forming part of the portion of the bolt extended by the rear lug.

* * * * *